Figure 1:
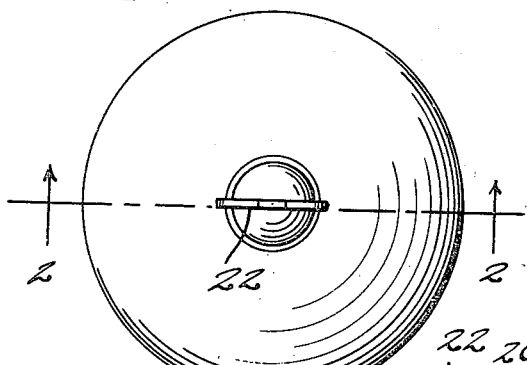

June 8, 1948. W. C. WHITE 2,442,793
TRUSS PAD
Filed March 18, 1946

Inventor
W. C. White
By Kimmel & Crowell
Attorneys

Patented June 8, 1948

2,442,793

UNITED STATES PATENT OFFICE 2,442,793

TRUSS PAD

Walter Carman White, Los Angeles, Calif.

Application March 18, 1946, Serial No. 655,154

2 Claims. (Cl. 128—116)

This invention relates to truss pads.

An object of this invention is to provide an improved pad for truss belts or supporting means which is adapted to yieldingly hold the pad in contact with the body.

Another object of this invention is to provide a pad which is so constructed that the pressure of the pad against the body may be adjusted so that the pad will provide the necessary pressure on the affected part.

With the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, variations, and modifications may be resorted to which fall within the scope of the invention as claimed.

Figure 2:
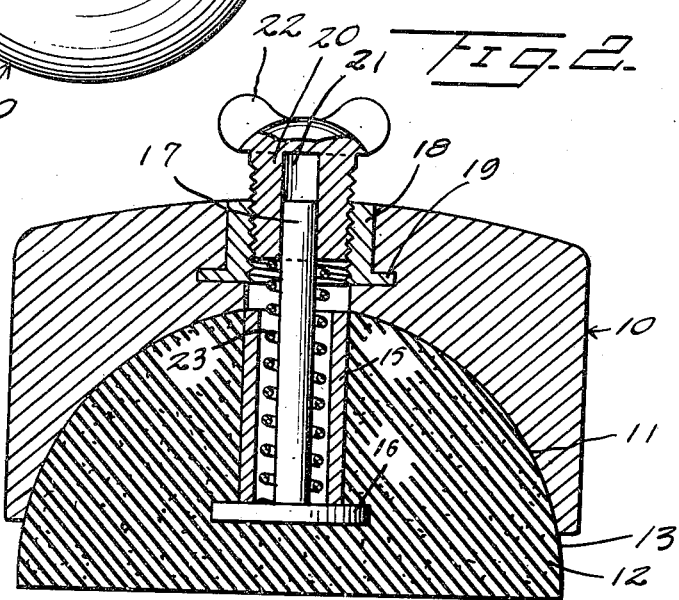
Figure 3:
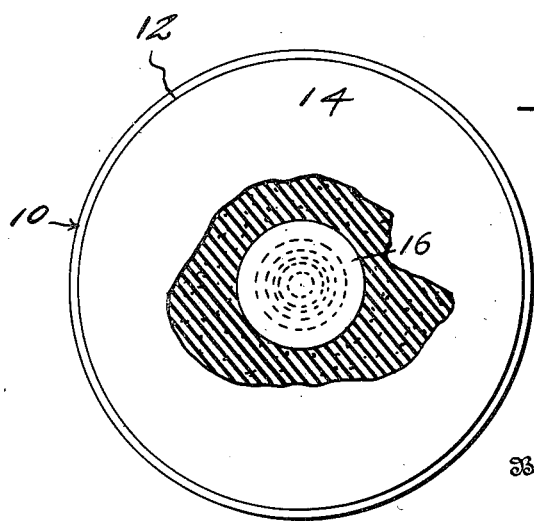

In the drawings:

Figure 1 is a detailed front elevation of a pad constructed according to an embodiment of this invention, Figure 2 is a sectional view taken on the line 2—2 of Figure 1, Figure 3 is an inner end elevation partly broken away and in section of the pad.

Referring to the drawings the numeral 10 designates generally a body which is round in front elevation and is formed on its rear side with a concave recess or seat 11. A resilient pad member 12, which is formed with a convex surface 13 is adapted to snugly seat in the recess 11 and is provided at its outer side with a body engaging surface 14.

In order to provide a means whereby the pad member 12 may be resiliently supported and tensioned with respect to the body 10, I have provided a sleeve 15 which is embedded in the cushion member 12 and is provided at its outer end with a flanged head 16 which is disposed in inwardly spaced relation with respect to the body engaging surface 14.

A stud or stem 17 is secured centrally of the sleeve 15 and to the inner side of the head 16, being substantially longer than the sleeve 15. A sleeve or bushing 18 is embedded in the body 10 being formed at its inner end with a flange 19. The sleeve or bushing 18 is internally threaded and a tensioning screw 20 is threaded into the bushing or sleeve 18, and is provided with a central bore opening through the inner end thereof, in which the stud or stem 17 slidably engages. The outer end of the screw 20 is formed with wings 22 by means of which the screw 20 may be manually adjusted.

A cushion tensioning spring 23 is disposed about the stud or stem 17 within the sleeve 15 and bears at its outer end against the inner end of the screw 20. In this manner, when the screw 20 is threaded inwardly the spring 23 will be placed under the desired tension.

In the use of this pad construction the body 10 may be secured in any suitable manner to the supporting strap or straps for supporting the body with the cushion member 12 confronting the desired part. The strap (not shown) is adjusted to the desired tightness whereupon screw 20 may be adjusted so as to provide the additional tension necessary at the desired point on the body. The head 16 of the sleeve 15 provides a stay means within the cushion member 12 for disposing the necessary pressure against the body at the desired spot. It will be understood that the cushion members herein disclosed may be made out of sponge rubber or other suitable yieldable material and the supporting body therefor may be made out of composite material such as gasket-composition, Bakelite or other composite material.

What I claim is:

1. A truss pad comprising a body member, a cushion carried by said body, said body having a concave recess in the rear side thereof, said cushion seated in said recess and projecting therefrom, a rigid sleeve embedded in said cushion, a disc on said sleeve within said cushion, a stud secured at one end thereof to an end of said sleeve within said cushion and extending therefrom into said body, a screw threaded into said body and formed with a central guide bore within which the adjacent end of said stud is slidable, and a spring within said sleeve and about said stud, said spring bearing against said screw whereby adjustment of said screw will tension said spring and cushion.

2. A truss pad comprising a body formed with a socket on one side thereof, a cushion member seated in said socket and projecting therefrom, a disc embedded in said cushion member, a tubular sleeve fixed to said disc in said cushion a stem fixed to said disc within said sleeve and extending through said cushion, an internally threaded bushing carried by said body, and a cushion distorting and tensioning screw threaded in said bushing and formed with a central opening in which said stem loosely engages, inward threading of said screw moving said stem inwardly and thereby effecting distortion of said cushion member centrally thereof, and applying predetermined pressure on the affected part.

WALTER CARMAN WHITE.

REFERENCES CITED

The following references are of record in the file of this patent:

UNITED STATES PATENTS

| Number | Name | Date |
|---|---|---|
| 461,038 | Naidl | Oct. 13, 1891 |
| 463,717 | Flodin | Nov. 24, 1891 |
| 621,078 | Harkinson et al. | Mar. 14, 1899 |
| 881,218 | Bathrick | Mar. 10, 1908 |
| 1,211,250 | Shipley | Jan. 2, 1917 |
| 1,225,177 | Rodenbaugh | May 8, 1917 |
| 2,073,289 | Shaw | Mar. 9, 1937 |

FOREIGN PATENTS

| Number | Country | Date |
|---|---|---|
| 23,545 | Great Britain | Dec. 4, 1914 |
| 606,810 | Germany | Dec. 11, 1934 |